US006121621A

United States Patent [19]

Warashina et al.

[11] Patent Number: 6,121,621

[45] **Date of Patent: *Sep. 19, 2000**

[54] ULTRAVIOLET DETECTOR

[75] Inventors: Hidenaga Warashina; Yuji Shimazu, both of Hamamatsu, Japan

[73] Assignee: Hamamatsu Photonics K.K., Hamamatsu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,334

[22] Filed: Sep. 25, 1997

[30] Foreign Application Priority Data

| | | | |
|---|---|---|---|
| Sep. 26, 1996 | [JP] | Japan | 8-255080 |
| Oct. 14, 1996 | [JP] | Japan | 8-270776 |

[51] Int. Cl.[7] .................... G01J 1/04; G01J 5/02; H01J 47/00

[52] U.S. Cl. .................... 250/372; 250/374; 313/539; 313/544; 313/542

[58] Field of Search .................... 250/372, 374; 313/538, 539, 542, 544

[56] References Cited

U.S. PATENT DOCUMENTS

| | | | |
|---|---|---|---|
| 3,344,302 | 9/1967 | Engh et al. | 313/538 |
| 5,504,386 | 4/1996 | Kyushima et al. | 313/103 R |

FOREIGN PATENT DOCUMENTS

| | | |
|---|---|---|
| 49-17184 | 5/1974 | Japan . |

*Primary Examiner*—Constantine Hannaher
*Assistant Examiner*—Albert Gagliardi
*Attorney, Agent, or Firm*—Pillsbury Madison & Sutro LLP

[57] ABSTRACT

An ultraviolet detector comprises a metal tubular member which hermetically encloses an anode and a cathode therein and is filled with a discharged gas introduced therein from a metal exhaust tube. After the anode and the cathode are enclosed within the tubular member, the ultraviolet detector can be made without being subjected to any glass fusing process. Accordingly, the inside of the sealed vessel V1 can be prevented from being contaminated with fluorine, whereby the ultraviolet detector with stable characteristics can be provided.

3 Claims, 6 Drawing Sheets

ULTRAVIOLET DETECTOR

BACKGROUND OF THE INVENTION

1. Field of the Invention

The present invention relates to an ultraviolet detector which detects ultraviolet radiation incident thereon by converting them into an electric signal.

2. Related Background Art

An example of conventional ultraviolet detectors is disclosed in Japanese Utility model Publication No. 49-17184. This publication discloses an ultraviolet detector in which an anode and a cathode are disposed within a sealed vessel constituted by a glass envelope and a glass bottom plate welded to the bottom portion of the glass envelope.

Though the conventional ultraviolet detector mentioned above is an excellent detector which has a long life and can stably detect ultraviolet radiation, its characteristics may not be sufficient. Specifically, when used for a long period of time, its characteristics may deteriorate over time, thus lacking in stability.

SUMMARY OF THE INVENTION

In order to overcome such shortcomings, various studies have conventionally been made. The inventors have elucidated that these shortcomings result from the glass material used as a window material for the ultraviolet detector. Typical glass materials which are transparent to ultraviolet radiation contain fluorine. Upon welding of the envelope and bottom plate of the ultraviolet detector, fluorine contained in the glass material evaporated from the glass material and adsorbed onto the surfaces of the anode and cathode, the inner surface of the sealed vessel, and the like. Normal operation of the detector and the aging process in fabrication both include the gas discharge between the electrodes. Electrons and ions generated by the gas discharge impinge onto the surfaces of the anode and cathode respectively. It causes the desorption of fluorine adsorbed on the surface of these electrodes. The fluorine containments on the other sites in the vessel can also be desorbed by means of the heat which arises in the aging processes of the detector fabrication and even in the normal operation condition of the detector. The desorbed fluorine alters the ionization property of the discharged gas filled in the vessel. This alternation commonly results in the lowering of the breakdown voltage and that leads to occasional and continuous false discharges and unwanted increase of the sensitivity. These effects considerably degrade the stability and the reliability of the detector.

In order to overcome the foregoing shortcomings resulting from the use of such a glass material, it is an object of the present invention to provide an ultraviolet detector having characteristics which are better than those conventionally attained.

The ultraviolet detector in accordance with the present invention comprises a sealed vessel, an anode, a cathode, a lead pin and a gas enclosed in the sealed vessel. The sealed vessel includes a tubular member having an opening and being made of a metal material blocking ultraviolet radiation, a window member being made of a glass material transparent to ultraviolet radiation and closing aforementioned opening and a stem having a metal portion contacting to the tubular member and a glass portion not contacting the tubular member. The anode is disposed within the sealed vessel at positions opposing said window member by the lead pin which penetrates the glass portion of the stem for supplying voltage. The cathode is disposed within the sealed vessel between the window member and the anode and secured to the tubular member or the metal portion of the stem.

In such a configuration, since the tubular member is made of a metal material blocking ultraviolet radiation, incident ultraviolet radiation are introduced through the window member made of an ultraviolet-transparent material toward the anode and cathode of the detector, whereby the detector exhibits a high directivity. Further, since the tubular member is made of a metal material, even when this tubular member is connected to the metal portion of the stem by pressure or welding, impurities such as fluorine do not attach to the sealed vessel, anode, and cathode. Accordingly, the ultraviolet detector in accordance with the present invention is prevented from being affected by fluorine or the like, whereby the break down voltage of the detector can be held stably.

And more, the cathode of the present invention is secured to the tubular member or the metal portion of the stem without a stem pin. So it is easy to manufacture the ultraviolet detector having discharging gap with a high precision.

According to the present invention, the cathode may be integrated with the tubular member or the metal portion of the stem may be a ring shaped rim of the stem.

Such configuration aids in facilitating manufacture of high accurate ultraviolet detector.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
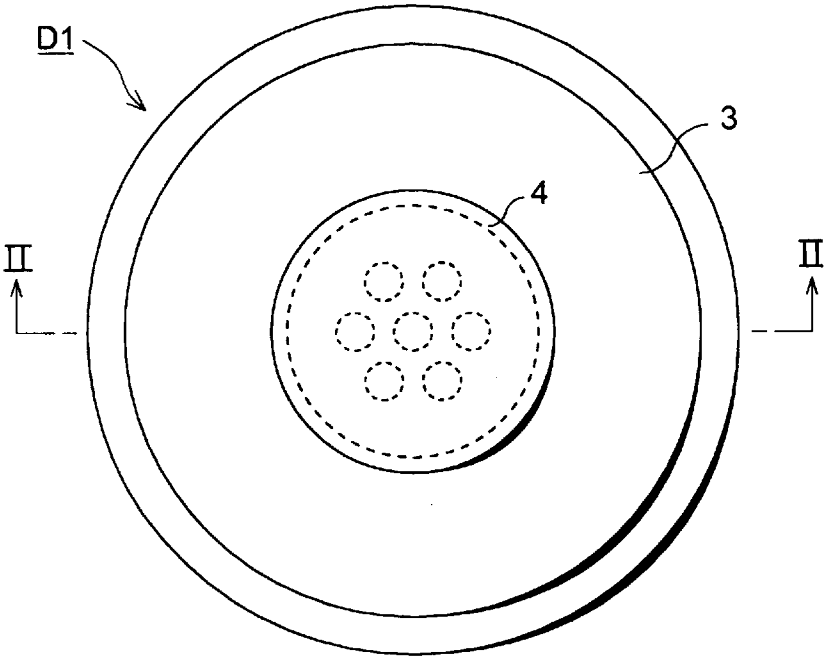
FIG. 1 is a plan view showing an ultraviolet detector in accordance with a first embodiment of the present invention.

In the following, embodiments of the ultraviolet detector will be explained. Elements identical to each other will be referred to with marks identical to each other, without their overlapping explanations being repeated. In the following explanation, vertical orientations conform to those in the drawings.

Figure 2:
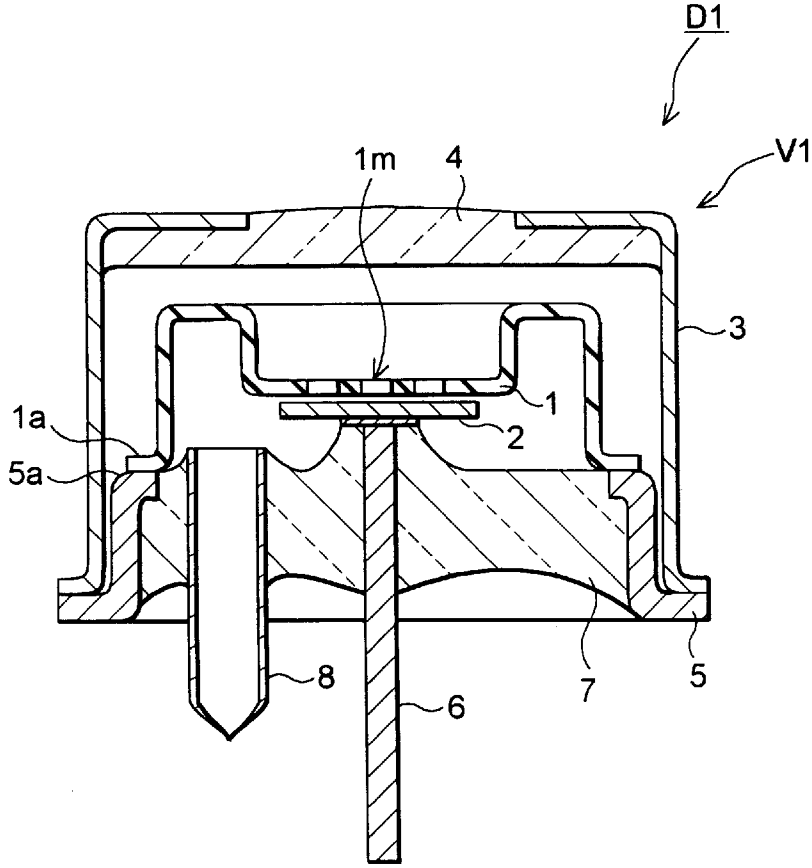
FIG. 2 is a sectional view of the ultraviolet detector taken along line II—II of FIG. 1.

FIG. 1 is a plan view of an ultraviolet detector D1 in accordance with a first embodiment of the present invention. FIG. 2 is a sectional view of the ultraviolet detector D1 taken along line II—II of FIG. 1. This detector comprises a sealed vessel V1, and an anode 1 and a cathode 2 which are disposed within the sealed vessel V1.

The sealed vessel V1 comprises a tubular member 3, made of a metal material blocking ultraviolet radiation, having two openings; a window member 4, made of an ultraviolet-transparent glass material, closing one of the openings of the tubular member 3; a ring-shaped metal member 5 secured to the tubular member 3 so as to close the other opening of the tubular member 3; and a glass sealant 7 sealing the opening in the ring-shaped metal member 5. The lower side wall portions of the tubular member 3 and ring-shaped metal member 5 are curved so as to project outward, and their curved portions are electrically welded together so as to overlap each other. The middle side wall portion of the ring-shaped metal member 5 is in parallel with the middle side wall portion of the tubular member 3, thus constituting a cylinder. The upper side wall portion of the ring-shaped metal member 5 is curved inward, and this upper curved portion has an outer surface 5*a* which is used for positioning the anode 1.

The region of the anode 1 opposing the window member 4 is depressed, with respect to its surrounding area, toward the cathode 2. Also, a grid or mesh 1*m* is formed in this region. The anode 1 extends from the surrounding area of the depression toward the positioning outer surface 5*a* of the ring-shaped metal member 5, and its end portion 1*a* in the extending direction is curved outward so as to be in parallel with the outer surface 5*a* of the upper end of the ring-shaped metal member 5. The anode 1 is positioned with respect to the ring-shaped member 5 when its end portion 1*a* is simply fixed with respect to the outer surface 5*a*.

The cathode 2 is placed at a position opposing the mesh region 1*m* formed at the depression of the anode 1. From the lower surface of the cathode 2, a lead pin 6 extends through the center of the ring-shaped metal member 5. The lead pin 6 is firmly embedded in the glass sealant 7 filling the opening of the ring-shaped metal member 5. Accordingly, the anode 1 is positioned with respect to the cathode 2 connected to the lead pin 6 when the end portion la is simply fixed with respect to the outer surface 5*a* of the ring-shaped metal member 5. Also embedded in the glass sealant 7 is a metal evacuation pipe 8 communicating with the inside of the sealed vessel V1. The metal evacuation pipe 8 is used for introducing a rare gas such as argon into the sealed vessel V1. After such a gas is introduced, the outer end of the metal evacuation pipe 8 is sealed. For the cathode 2, any material can be used as long as it has a work function of 4.1 eV or higher. For example, Ni (nickel), Mo (molybdenum), or W (tungsten) may be used. The material for the cathode 2 in this embodiment is Ni, whereas the lead pin 6 and the tubular member 3 are made of covar. The window member 4 is made of ultraviolet-transparent glass (UV glass), and ultraviolet radiation having a wavelength of about 190 nm or longer can be transmitted therethrough. In the case where the UV glass is made of ultraviolet-transparent borosilicate glass, its coefficient of thermal expansion can be made closer to that of covar metal, whereby it can be easily attached to the tubular member 3, thus facilitating the manufacture of the ultraviolet detector.

Figure 3:
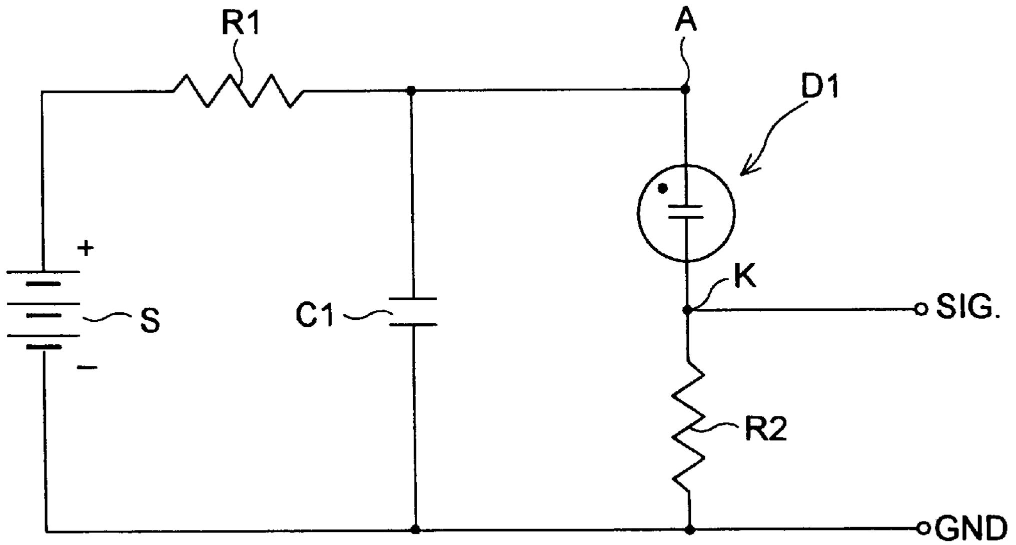
FIG. 3 is a circuit diagram showing a driving circuit of the ultraviolet detector shown in FIG. 1.

FIG. 3 is a circuit diagram showing a driving circuit of the ultraviolet detector D1. When a voltage is applied between the tubular member 3 and the lead pin 6 from a power supply S1 by way of resistors R1 and R2, the voltage is applied between the anode 1 and the cathode 2, thereby generating an electric field. The applied voltage is higher than the lowest voltage that discharges between the anode 1 and cathode 2 can be induced in response to incident ultraviolet radiation, while being lower than the lowest voltage that spontaneously induces discharge when there is no incident ultraviolet radiation. In this embodiment, a voltage of about 350 V is applied. Since the tubular member 3 is made of a metal material blocking ultraviolet radiation, incident ultraviolet radiation are introduced toward the anode 1 and cathode 2 of the detector D1 through the window material 4 made of an ultraviolet-transparent material. Accordingly, the detector D1 has a high directivity. In this state, when the surface of the cathode 2 is irradiated with ultraviolet radiation passing through the window member 4 and the mesh region 1*m* of the anode 1, photoelectrons are emitted from the cathode 2. Thus generated photoelectrons are accelerated toward the anode 1 due to the electric field between the anode 1 and the cathode 2, and collide with molecules of the gas between the anode 1 and the cathode 2, thereby causing an electron avalanche. Due to the electron avalanche, a number of cations are generated between the anode 1 and the cathode 2. These cations are accelerated toward the cathode 2 by the electric field and collide with the surface of the cathode 2, whereby a number of secondary electrons are emitted from the cathode 2. Like the photoelectrons, the secondary electrons generate an electron avalanche, whereby the discharge current between the anode 1 and the cathode 2 rapidly increases in response to incident ultraviolet radiation. Though the charge of discharge current is supplied by a capacitor C1, the discharge is terminated within a short period of time since the bias voltage between the anode 1 and the cathode 2 decreases in response to the rapid increase in discharge current. Consequently, ultraviolet radiation are detected as a current pulse. Generated at both ends of the resistor R2 is a voltage pulse, which is monitored to detect ultraviolet radiation. During the fusion bonding, contaminants include fluorides and oxides are produced on the surface of this partially assembled part. To remove these contaminants, a treatment using acid solution is performed.

In the following, a method of making the ultraviolet detector D1 shown in FIGS. 1 and 2 will be explained. First, the lead pin 6 is welded to the lower surface of the cathode 2. Thus welded cathode 2 and lead pin 6 are secured to the inside of the ring-shaped metal member (metal shell) 5 by means of the glass sealant 7 that is fusion-bonded thereto. This securing process is effected such that the upper surface of the cathode 2 is placed at a predetermined height from the positioning surface 5*a*, and the metal evacuation pipe 8 is secured to the inside of the ring-shaped metal member 5 by means of the glass sealant 7 such that the upper end of the metal evacuation pipe 8 projects above the positioning surface 5*a*. The frequency at which pulses are generated is in proportion to the intensity of the ultraviolet radiation when the ultraviolet radiation is low and saturated when the intensity of ultraviolet radiation is high.

Subsequently, the lower surface of the lower end 1*a* of the anode 1 is welded onto the positioning surface 5*a*. Accordingly, the mesh region 1*m* of the anode 1 and the upper surface of the cathode 2 are positioned on the basis of the positioning surface 5*a*. Namely, the accuracy in distance between the anode 1 and the cathode 2 (i.e., discharging gap) is determined by the processing precision of the anode 1 and protrusion height of the cathode 2 respect to the positioning surface 5*a*. Even when the cathode 2 connected to the lead pin 6 is somewhat deformed upon shock or heat, the distance between the anode 1 and the cathode 2 is held with a high accuracy, thus reducing characteristic errors in each ultraviolet detector being produced.

Next, the window member 4 is fusion-bonded to the inside of the tubular member 3 so as to close the upper opening of the tubular member 3 from the inside. And then, this partially assembled part is treated by acid solution so that contaminants including fluorides and oxides are removed. Thereafter, the tubular member 3 (cap) is mounted on the ring-shaped metal member 5 such that the inner surface of the outward curved portion (flange) at the lower end of the tubular member 3 is superposed on the outer surface of the outward curved portion (flange) at the lower end of the ring-shaped metal member 5, and these curved portions are welded together. Since the tubular member is not made of glass but a metal, fluorine which is contained in the ultraviolet-transparent glass, for example by 1.9 wt % does not attach to the sealed vessel V1 even in this process. Also, since the tubular member 3 is not made of glass, silica, which is a main component of glass, does not evaporate upon this welding process, fine particles of silica are prevented from attaching to the sealed vessel V1 and electrodes 1 and 2 and thereby causing abnormal discharge. Then, the evacuation pipe 8 is connected to a high vacuum apparatus so as to remove the gas from within the sealed vessel V1, and the sealed vessel V1 is externally heated so as to affect baking. After the pressure within the sealed vessel V1 is sufficiently lowered to attain a substantially vacuum state, a reducing mixed gas is introduced into the sealed vessel V1 from the lower end of the metal evacuation pipe 8. After the gas is introduced, the lower end of the metal pipe 8 is pinched and sealed by pressure, thereby establishing a hermetic state within the sealed vessel V1. Since the metal evacuation pipe 8 is not made of glass, even when one end thereof is thus sealed, fluorine and silica are not introduced into the vessel V1.

Figure 4:
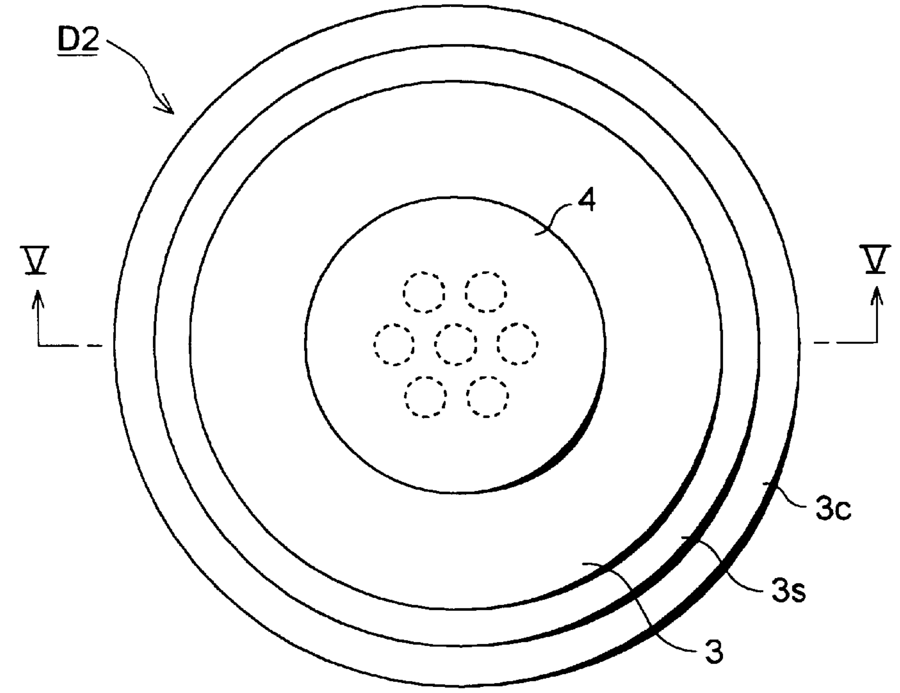
FIG. 4 is a plan view showing an ultraviolet detector in accordance with a second embodiment of the present invention.
Figure 5:
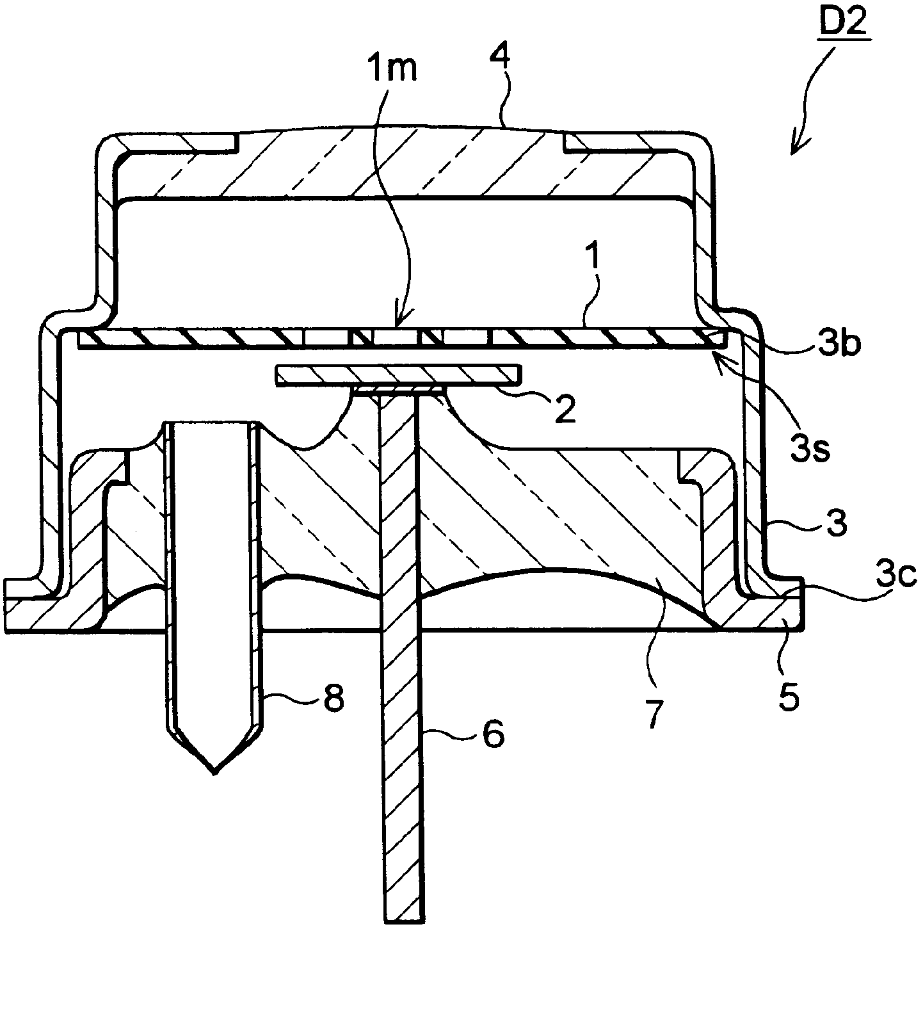
FIG. 5 is a sectional view of the ultraviolet detector taken along line V—V of FIG. 4.

In the following, an ultraviolet detector D2 in accordance with a second embodiment of the present invention will be explained. FIG. 4 is a plan view showing the ultraviolet detector D2. FIG. 5 is a sectional view of the ultraviolet detector D2 taken along line V—V of FIG. 4. This detector differs from that shown in FIGS. 1 and 2 only in the configurations of the upper part of the tubular member 3 and the anode 1. The diameter of the tubular member 3 differs between the upper part and lower part of the outer wall in its axial direction. Namely, the upper part of the outer wall has a diameter smaller than that of the lower part thereof, whereby their inner faces form a step 3*s* at the boundary therebetween. The step 3*s* of the inner face of the tubular member 3 has a lower surface 3*b* in parallel with the window member 4. Welded to the lower surface 3*b* of the step 3*s* is the upper surface of the outer edge of the planar anode 1. The distance between the upper surface 3*c* of the flange at the lower end of the ring-shaped metal member 5 and the lower surface 3*b* of the step 3*s* is constant. Accordingly, the anode 1 is positioned with respect to the upper surface 3*c* of the flange at the lower end of the ring-shaped metal member 5 when the anode 1 is simply welded to the lower surface 3*b* of the step 3*s*. The upper surface of the cathode 2 is fixed by the glass sealant 7 such that the distance from the upper surface 3*c* of the flange is made constant. Accordingly, the distance between the mesh region 1*m* of the anode 1 and the upper surface of the cathode 2 (i.e., discharging gap) is determined on the basis of the upper surface 3*c* of the flange, and its accuracy is determined by the processing precision of step 3*s* of the tubular member 3 and ring-shaped metal member 5. In the ultraviolet detector D2, after the anode 1 is fixed to the step 3*s* of the tubular member 3 whose one opening is sealed with the window member 4, the tubular member 3 is mounted on the ring-shaped metal member 5 such that the inner surface of the outward curved portion (flange) at the lower end of the tubular member 3 is superposed on the outer surface of the outward curved portion (flange) at the lower end of the ring-shaped metal member 5, and these curved portions are welded together, thus yielding the sealed vessel V1.

Figure 6:
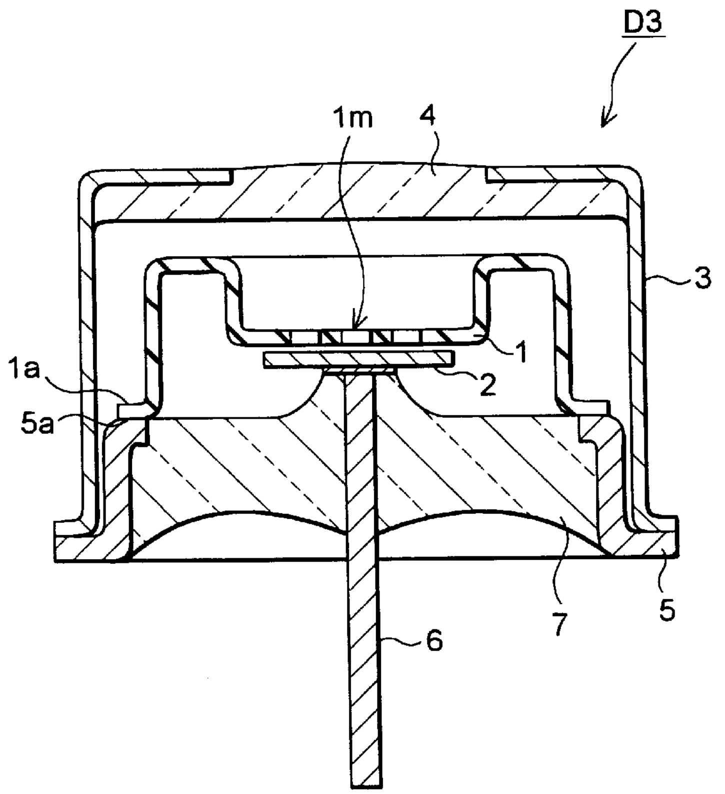
FIGS. 6 to 11 are vertical sectional views of ultraviolet detectors in accordance with other embodiments of the present invention, respectively.
Figure 7:
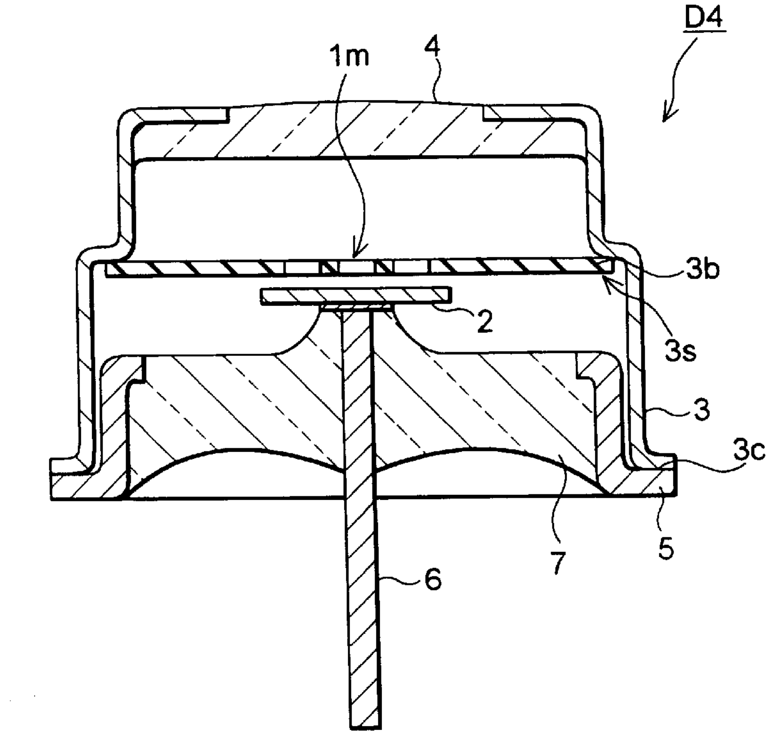

FIGS. 6 and 7 are vertical sectional views showing ultraviolet detectors D3 and D4 in accordance with third and fourth embodiments of the present invention, respectively. The ultraviolet detectors D3 and D4 correspond to the ultraviolet detectors D1 and D2 shown in FIGS. 2 and 5, respectively, though differing therefrom only in that the evacuation pipe 8 is not provided. These detectors can be made by a method comprising the steps of introducing the tubular member 3 and the ring-shaped metal member 5 which have not yet been welded together into a vacuum chamber; heating the chamber; filling the chamber with a mixed gas; and then connecting these members to each other by resistance welding technique.

Figure 8:
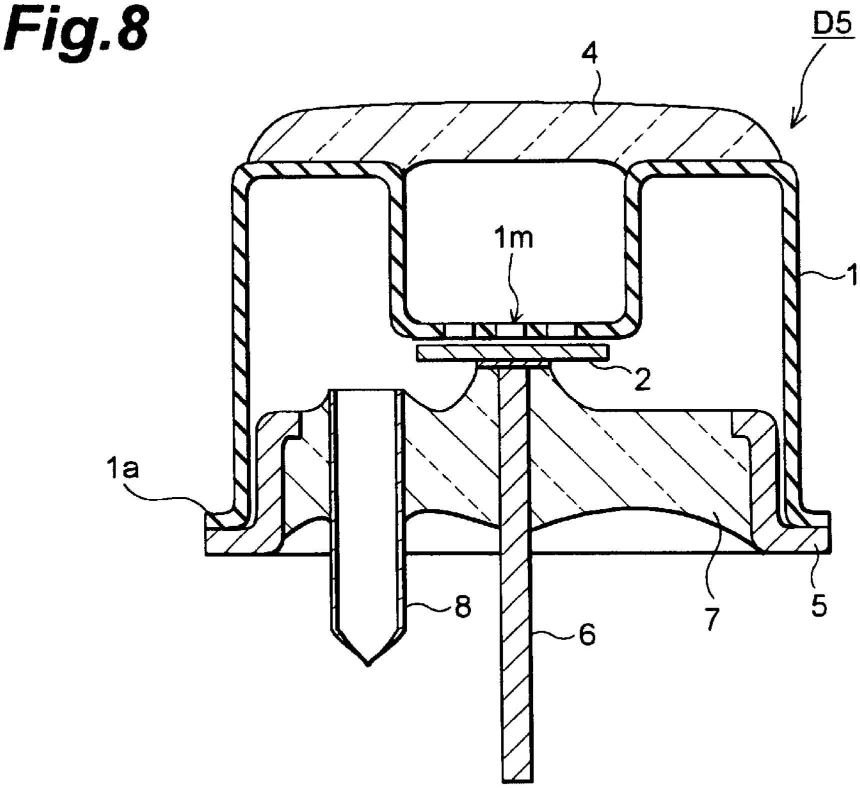
Figure 9:
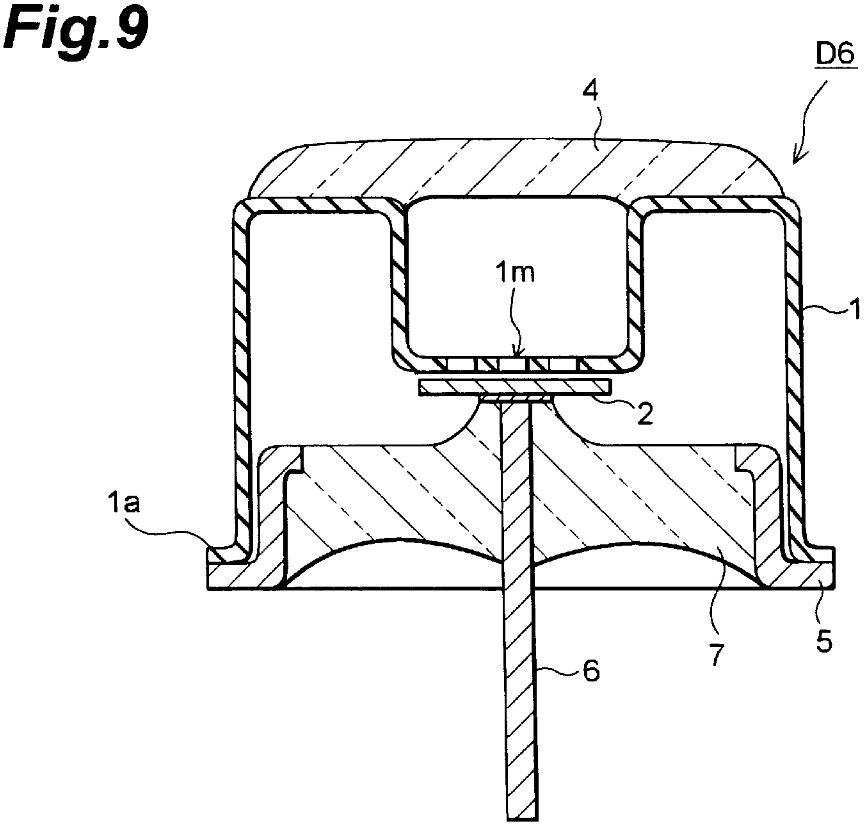

FIGS. 8 and 9 are vertical sectional views showing ultraviolet detectors D5 and D6 in accordance with fifth and sixth embodiments of the present invention, respectively. The ultraviolet detector D6 shown in FIG. 9 has a configuration in which the evacuation pipe 8 is eliminated from the ultraviolet detector D5 shown in FIG. 8. In the other respects, their configurations are the same. The ultraviolet detector D5 differs from the ultraviolet detector D1 of the first embodiment in that the anode 1 also serves as the tubular member 3. Due to such a configuration, it becomes easier to manufacture a small detector in particular.

Figure 10:
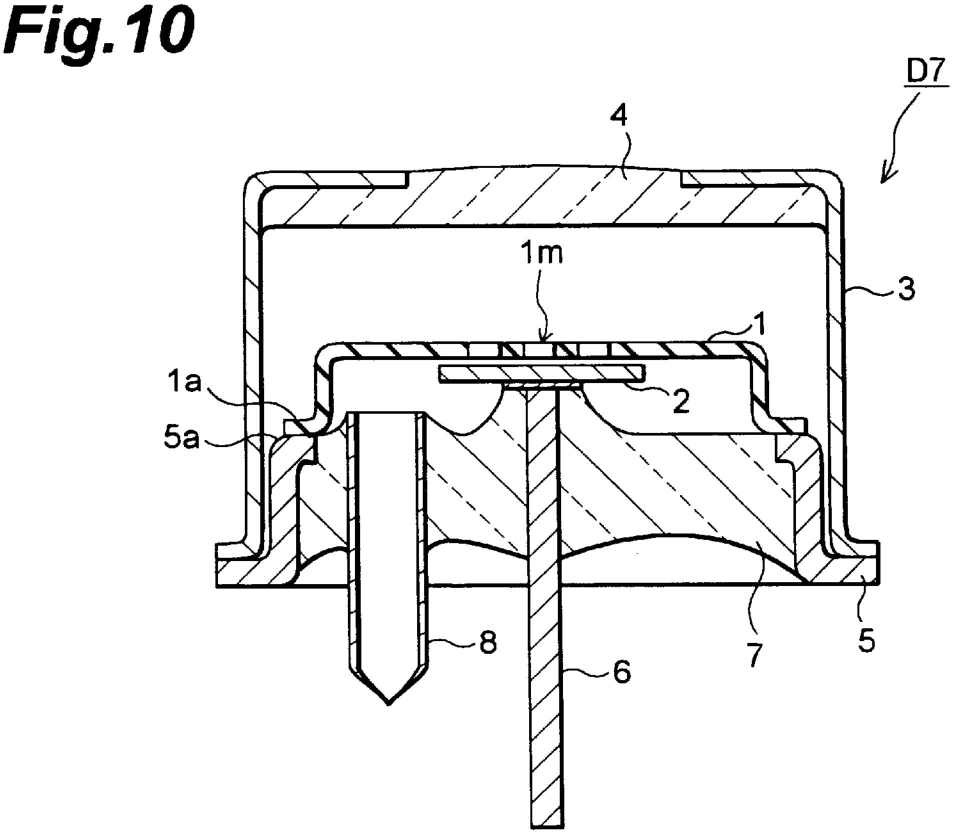
Figure 11:
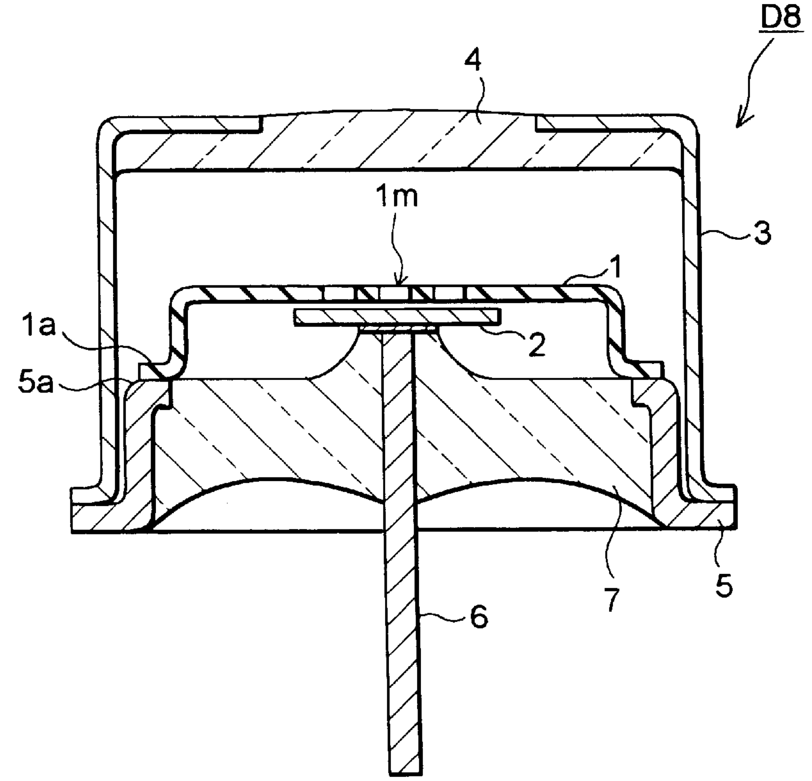

Finally, FIGS. 10 and 11 are vertical sectional views showing ultraviolet detectors D7 and D8 in accordance with seventh and eighth embodiments of the present invention, respectively. The ultraviolet detector D8 shown in FIG. 11 has a configuration in which the evacuation pipe 8 is eliminated from the ultraviolet detector D7 shown in FIG. 10. In the other respects, their configurations are the same. The ultraviolet detector D7 differs from the ultraviolet detector D1 shown in FIG. 2 in the configuration of the anode 1. As compared with the ultraviolet detector D1 shown in FIG. 2, the ultraviolet detector D7 may be disadvantageous for keeping the distance between the anode 1 and the cathode 2 with a high accuracy. Nevertheless, due to its resulting simpler configuration, it can be manufactured at a lower cost.

Without being restricted to the foregoing embodiment, the present invention can further be modified in various manners.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No.8-255080 (255080/1996) filed on Sept. 26, 1996 and No.8-270776 (270776/1996) filed on Oct. 14, 1996 are hereby incorporated by reference.

What is claimed is:

1. An ultraviolet detector comprising:

a sealed vessel including a tubular member, a window member and a stem, said tubular member having an opening and being made of a metal material blocking ultraviolet radiation, said window member being made of a glass material transparent to ultraviolet radiation and closing said opening, said stem having a metal portion contacting to said tubular member and a glass portion not contacting said tubular member;

an anode disposed within said sealed vessel at positions opposing said window member;

a cathode, disposed within said sealed vessel between said window member and said anode, secured to said tubular member or said metal portion of said stem;

a lead pin penetrating said glass portion of said stem for securing said anode and supplying voltage to said anode; and a gas enclosed in said sealed vessel.

2. An ultraviolet detector according to claim 1, wherein said cathode is integrated with said tubular member.

3. An ultraviolet detector according to claim 1, wherein said metal portion is a ring shaped rim of said stem.

* * * * *